United States Patent [19]

Bethe

[11] 4,197,342

[45] Apr. 8, 1980

[54] TRIM PADS FOR VEHICLE SEATS

[75] Inventor: Eugene J. Bethe, Mishawaka, Ind.

[73] Assignee: Uniroyal, Inc., New York, N.Y.

[21] Appl. No.: 844,772

[22] Filed: Oct. 25, 1977

Related U.S. Application Data

[60] Continuation of Ser. No. 663,480, Mar. 3, 1976, abandoned, which is a division of Ser. No. 487,909, Jul. 12, 1974, Pat. No. 3,961,001.

[51] Int. Cl.² .............................................. B32B 3/30
[52] U.S. Cl. ................... 428/159; 428/172; 428/245; 428/286; 428/310; 297/452
[58] Field of Search ............ 428/151, 159, 160, 310, 428/172, 245, 286; 264/51, 54, 50, 331, 257, 48, 293, 321, 46.4, 42, 236; 156/78, 79; 260/2.5 L; 297/452, DIG. 1, DIG. 2

[56] References Cited

U.S. PATENT DOCUMENTS

| | | | |
|---|---|---|---|
| Re. 27,366 | 5/1972 | Dunn | 260/23 EM |
| 2,327,001 | 8/1943 | Schott | 264/50 |
| 2,770,864 | 11/1956 | Weese | 264/46.5 |
| 2,920,977 | 1/1960 | Adams | 428/159 |
| 2,943,949 | 7/1960 | Peboy | 428/159 |
| 3,080,613 | 3/1963 | Wall et al. | 264/54 |
| 3,222,697 | 12/1965 | Scheermesser | 428/160 |
| 3,243,491 | 3/1966 | Bethe | 264/50 |
| 3,285,768 | 11/1966 | Habib | 428/160 |
| 3,378,432 | 4/1968 | Spencer | 428/160 |
| 3,519,308 | 7/1970 | Kasman et al. | 297/452 |
| 3,650,995 | 3/1972 | Erickson | 260/2.5 L |
| 3,656,807 | 4/1972 | Aridu et al. | 297/452 |
| 3,867,240 | 2/1975 | Doerthing | 428/159 |
| 3,874,731 | 4/1975 | Jordan | 297/452 |
| 3,887,678 | 6/1975 | Lewicki, Jr. | 428/159 |
| 3,932,245 | 1/1976 | Erb et al. | 428/159 |
| 3,948,822 | 4/1976 | Wietsma | 260/2.5 L |
| 3,953,639 | 4/1976 | Lewicki, Jr. | 428/159 |
| 4,055,613 | 10/1977 | Kapral | 428/159 |

*Primary Examiner*—Stanley S. Silverman
*Attorney, Agent, or Firm*—Philip Rodman

[57] ABSTRACT

The production, by either a batch process or a continuous process, of vehicle seat trim pads or like articles of cured polymer no-gel latex foam and having convex or crowned surfaces free of congealed polymer skin, is disclosed. In the process, a backing fabric is first laid on a pervious supporting surface. A no-gel latex foam is then deposited on the fabric, and an open-bottom open-top grid of a height not greater than that of the deposited mass of latex foam is placed into the latter, excess latex foam above the top plane of the grid being scraped off to impart to each pocket or island of foam a smooth and level top surface. The entire assembly is then subjected to dry heat to effect both a rapid dehydration and a curing of the latex foam. During the initial stage of this operation, the no-gel latex foam expands somewhat so that the top surface of each island thereof becomes crowned without having to be disposed in contact with a mold surface of appropriate contours. The grid is removed after curing has been completed, leaving a plurality of in situ formed channels separating the base-connected islands. An upholstery covering is then applied to the top surface of the finished pad in closely conforming relation to the crown surfaced islands, being secured to the pad by stitching through the bottoms of the channels. This abstract is not to be taken either as a complete exposition or as a limitation of the present invention, however, the full nature and extent of the invention being discernible only by reference to and from the entire disclosure.

9 Claims, 15 Drawing Figures

TRIM PADS FOR VEHICLE SEATS

This is a continuation of application Ser. No. 663,480, filed Mar. 3, 1976, which was a division of application Ser. No. 487,909, filed July 12, 1974 and now U.S. Pat. No. 3,961,001.

The present invention relates to the production of resilient articles made of cured polymer no-gel latex foam and having upper convex or crowned surfaces formed without being molded to that contour and thus being free of any "skin" of congealed polymer such as would have been present if the surfaces had been formed through contact of the foam with a mold surface.

Although the invention is of general utility in the formation of various types of articles having the desired properties, it will herein be described in the first instance as applied to the production of trim or "topper" pads such as are used in vehicle seats and lie directly beneath the upholstery material of the back support and/or buttock support portions of such vehicle seats.

Trim pads are conventionally formed from bodies of foam rubber or other polymer foam, one surface of which, hereinafter called the bottom surface, is adhered to a fabric backing to provide dimensional stability. The body also has a series of parallel, straight channels disposed on the surface thereof, hereinafter called the top or upper surface, facing away from the fabric backing. One of the functions of these channels, which divide the foam body into a series of base-connected islands, is to provide the locations at which respective portions of an upholstery material, conveniently a soft decorative fabric or a vinyl- or urethane-coated fabric the remaining portions of which closely follow the top contours of the pad, can be stitched to the pad base. When such a trim pad is installed in a vehicle seat, it is so oriented that the backing fabric faces away from the rider.

In order to provide a vehicle seat with the desired contoured appearance, support and tactile properties, it has been found highly desirable that the upper surface of each of the islands of foam of the trim pad incorporated in the seat have a crowned or covex configuration. Such crowned or convex configuration provides for a much more luxurious or "plush" appearance of the seat, with attendant implication of higher quality and greater softness and comfort, than would be provided by a flat surfaced trim pad. Conventionally, pads having such crowned or convex upper surfaces have been made by molding the same of a gellable whipped or air-froth polymer foam in a mold having concave bottomed cavities to define the top island surfaces.

The use of this technique has been found to lead to certain disadvantages. Firstly, a cementing step is required after the molding operation in order to bond the molded foam pad to the backing fabric, occasioning the additional production costs inherent in such a separate step. Furthermore, an outer "skin" of congealed polymer invariably forms on all surfaces of a molded article which are in contact with the inner surface of a mold. The presence of this outer skin on the upper convex or crowned surface of a molded trim pad detracts from the "hand" or feel (i.e. resilience upon compression) of the pad, however, and tends to lessen customer satisfaction with automobile seats made with such pads. Nevertheless, trim pads with crowned upper surfaces not encumbered by such a polymer "skin" have so far not been produced. The molding of the trim pad top surfaces to their crowned contours tends, moreover, to yield a significant proportion of product which must be rejected due to the entrapment of air at the foam/mold surface interfaces. Still further, the high shrinkage rates inherent in the gellable latex foams traditionally used in molding trim pads make it difficult to hold the molded trim pads to the dimensional tolerances necessary for the subsequent fabricating steps.

Other problems are encountered when such trim or topper pads are produced by depositing a frothed or whipped gellable polymer latex foam onto the surface of a supporting fabric backing, striking the excess latex foam off the fabric backing with a doctor blade, thereafter curing the composite of latex and fabric to produce a continuous sheet, and subsequently die-cutting this composite sheet to a peripheral outline approximating that of the surface required for the back support and/or the buttock support of the vehicle seat. The channels imparted to the pads made by this procedure are formed by a routing operation performed on the upper surface of the fully cured foam-fabric composite. This routing tends to disperse a great deal of rubber or other polymer dust into the surrounding atmosphere, both at the pad producer's plant and at the seat manufacturer's plant, and thus creates the need to provide for the avoidance of an environmental pollution and worker health hazard problem. The gellable polymer latex foam used in this pad-forming process gels essentially uniformly, however, so that the upper surfaces of the channel-bounded islands of the ultimate trim pads are flat rather than crowned or convex.

It is an important object of the present invention, therefore, to provide means enabling the aforementioned problems and disadvantages encountered in the prior art products and methods to be efficaciously overcome.

A more particular object of the present invention is to provide a novel and improved trim pad for vehicle seats which has a plurality of upwardly facing channel-bounded, base-connected islands of cured polymer foam each with a crowned or convex top surface, as well as a novel and improved method of making such trim pads wherein the top surfaces of the islands are formed without a molding operation, and the channels are formed without the need for a routing operation so as to eliminate a potential worker health hazard and environmental pollution problem.

It is another, more general object of the present invention, of course, to provide a foam rubber or other polymer foam article having a crowned or convex top surface which does not require a mold surface to enable it to attain that contour and thus is free of the congealed polymer skin that is inherently present on such surfaces when the same are formed by molding.

The objectives and advantages of the present invention are, basically, achieved through the manufacture of the desired trim pads or other articles, by means of either a batch process or a continuous process, of a no-gel polymer latex foam and without a top surface molding operation. Such a process in its broadest aspects includes the steps of laying a backing fabric, e.g. a lightweight woven or non-woven fabric, onto an appropriate foraminous or pervious supporting surface, depositing the no-gel latex foam on the fabric throughout a defined area thereof to at least a minimum height, placing an open-top open-bottom grid of a height not more than the said minimum height into the deposited latex foam, scraping excess amounts of the latex foam projecting above the top of the grid off the latter, rapidly dehydrating the latex foam by heat applied to both the top and bottom surfaces of the deposited mass thereof, continuing the application of heat until the foam is properly cured, and then removing the grid from the resultant body of cured latex foam. Since the grid consists of a peripheral frame with an arrangement of internal cross bars which have a height, as measured down from the top plane of the grid, that is somewhat less than the height of the peripheral frame, the cross bars form the desired channels in and thereby define the top surface islands of the trim pad. At the same time, since it is a property of the no-gel latex foam that unconfined regions thereof will expand somewhat upon being heated (by way of contrast to a gellable latex foam which will tend to shrink), the top regions of the pockets of foam in the grid, i.e. where the foam does not contact the side faces of either the peripheral frame or any of the cross bars of the grid, will rise during the dehydration and curing operation. As a result, the top surface of each such pocket of foam will assume a convex or crowned configuration. The islands of the ultimate trim pad thus will look (in terms of their overall contours only) as if their top surfaces had been shaped by being molded against a correspondingly contoured surface but, because of the latex foam/air interface, those surfaces will not have the usual impervious skin thereon. The pad will, therefore, have a better "hand" or resilience under compression than it would have had the island top surfaces been truly molded.

Optionally, in order to lessen the need for precision in depositing the starting no-gel latex foam on the backing fabric to a height relatively close to that of the grid, the foam may be deposited to an appreciably greater height and then preliminarily scraped or doctored to a height substantially equal to that of the peripheral frame. After the grid is then placed into the remaining layer of latex foam, any resultant excess quantities of foam protruding above the top plane of the frame are scraped or doctored off as previously set forth preparatory to the dehydration and curing operation. Any latex foam thus removed will, of course, be recycled, so that no loss of material will result. Also optionally, the finally scraped mass of latex foam (with the grid therein) may be preheated and thereby preliminarily dehydrated before being subjected to the final heating and curing operation.

After the grid has been removed from the cured body of latex foam, the latter is removed from the supporting surface and, if necessary, peripherally cut and trimmed to the final trim pad outline. A covering fabric is then laid over the top surface of each trim pad and stitched to the continuous base thereof at the bottoms of the respective channels between the crowned islands and at the peripherally outermost portions of the base, a sufficient amount of fabric being used to leave a peripheral margin extending beyond the outline of the pad for subsequent wrapping around and attachment to the frame members of a vehicle seat frame.

It will be understood that the foraminous supporting surface upon which the backing fabric is laid may comprise a perforated metal sheet or plate where the trim pads are produced by a batch process, which sheet or plate may be sufficient in area for only one or for several grids. Where the trim pads are made by a continuous process, the supporting surface will ordinarily be an endless belt formed of wire mesh or the like, and it will preferably be sufficiently wide to accommodate two grids placed end to end across the belt. In either case, the pervious nature of the supporting surface will enable evaporation of liquid during the heating and curing operation from both the top and the bottom of the layer of frothed, no-gel latex foam deposited on the supported backing fabric.

The foregoing and other objects, characteristics and advantages of the present invention will be more clearly understood from the following detailed description of several embodiments thereof when read in conjunction with the accompanying drawings in which.

Figure 2:
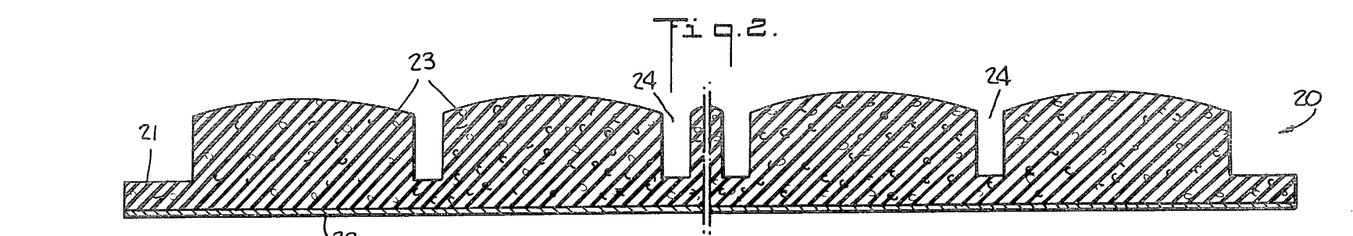
FIGS. 2 and 3 are fragmentary sectional views taken, respectively, along the lines 2—2 and 3—3 in FIG. 1.
Figure 3:
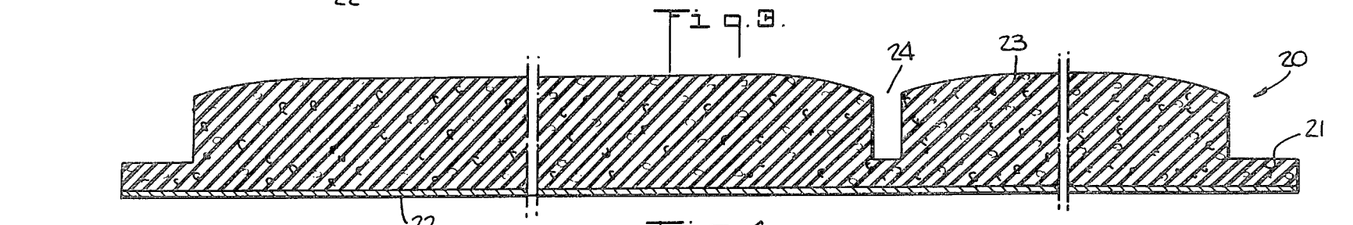

Referring now to the drawings in greater detail, the basic trim pad 20 (FIGS. 1, 2 and 3) according to the present invention is a body of cured polymer latex foam having a sheet-like base 21 bonded at its bottom face to a backing fabric sheet 22 (not shown in FIG. 1) and having at its top face a plurality of parallel islands 23 separated by relatively narrow channels 24. The backing fabric 22 preferably is a lightweight woven fabric, but it may be made of a different construction, e.g. as a non-woven fabric. Each of the islands 23 has a convex or crowned configuration at its top surface which, since it is achieved without those surfaces of the pad being shaped with the aid of a mold surface (as will be more fully described presently), is unencumbered by a "skin" of congealed polymer such as is characteristically formed on any foam body surfaces which are in contact with the walls of a mold cavity during a shaping and curing operation. The overall size of the trim pad as well as the sizes and number of islands will, of course, depend on and vary with the size of vehicle seat with which the pad is to be used. Merely by way of illustration and without limitation, a trim pad for a given size of passenger car bucket seat may have a grid-like arrangement of two rows of ten islands each on a base about 24 inches long, about 15 inches wide and about ¼ inch high, each of the islands being about 7 inches long, about 2 inches wide, about ¾ inch high (with respect to the base) at the apex of the crown surface, and about ⅝ inch high at each side, and the channels between adjacent islands being about ¼ inch wide.

Figure 4:
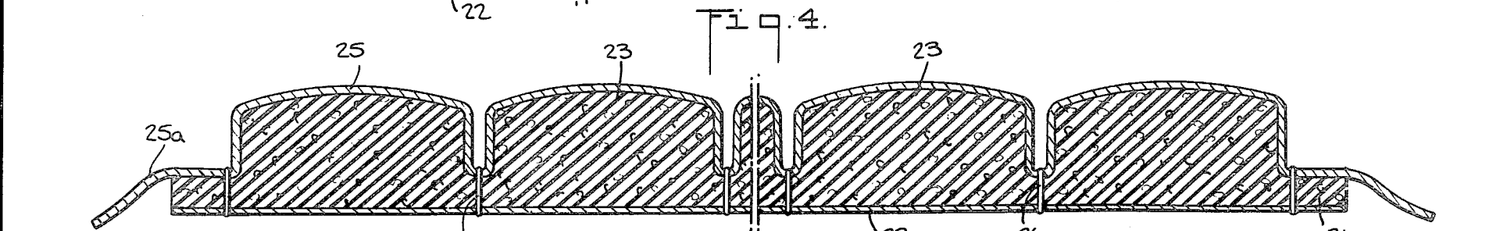
FIG. 4 is a sectional view similar to FIG. 2 but shows the trim pad with an upholstery cover attached thereto.

Prior to such a trim pad being installed in a vehicle, of course, an upholstery covering 25 made, for example, of a soft fabric, a vinyl- or urethane-coated fabric, or of any other suitable sheet material, is applied to the top surface of the pad (FIG. 4) so as to closely follow the contours of the islands 23, the portions of the covering 25 lying in the channels 24 being stitched to the base 21 as shown at 26. The covering 25 is ordinarily sufficient in size to leave a peripheral marginal region 25a thereof extending beyond the boundary edges of the base 21 of the pad, so as to enable the covering margins to be wrapped about the frame members of the vehicle seat during installation.

Figure 5:
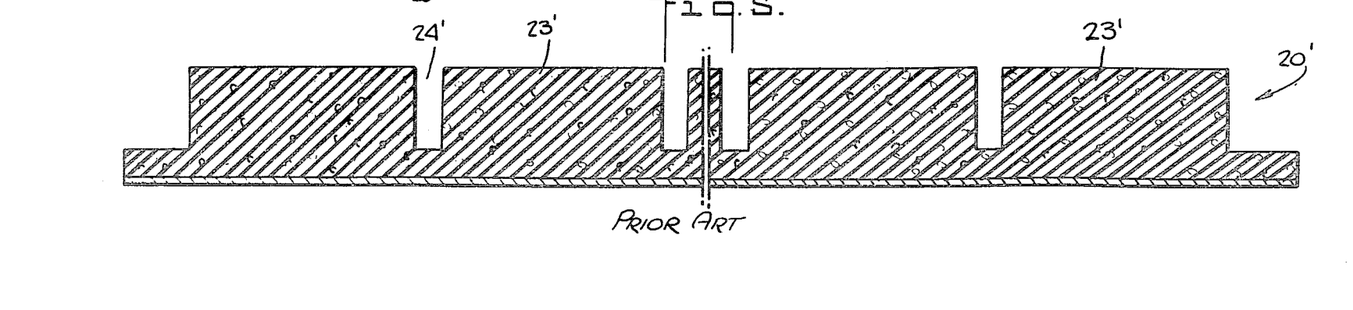
FIG. 5 is another sectional view similar to FIG. 2 but shows a trim pad with flat topped islands according to the prior art.

A trim pad according to the present invention, with crowned islands and when finished off as herein described, is found to have a luxurious, plush appearance and, by virtue of the skin-less top surfaces of the islands, to give a high degree of seating comfort. In all these properties it exceeds any of the heretofore known trim pads. A prior art trim pad 20' without upholstery material is shown in FIG. 5. In this pad, the islands 23' have flat top surfaces, although crowned or slightly convex surfaces would have been more desirable for the purpose of providing a more plush appearance. However, this sacrifice has been unavoidable if the formation of a congealed skin on the islands was to be avoided, since molding the pad so as to form crowned surfaces on the islands using conventional latex compositions not only leads to the formation of such a skin but also creates the other problems already described, such as entrapment of air in the mold, excessive shrinkage which makes the article unsuitable for the automatic stitching operations in manufacturing the upholstered automotive seat, etc. As previously mentioned, of course, though these mold-related drawbacks could be avoided by an open curing of conventional latex foam, in the prior art methods this entailed not only curing a continuous-surfaced body of gellable polymer latex foam with a flat top surface but thereafter routing out the channels 24' to form the islands 23', thereby creating both a pollution and a health hazard problem and the need for means to minimize or eliminate the same. All of these drawbacks and disadvantages are now effectively eliminated by the production of the trim pads according to the present invention in the manner which will now be described.

Figure 1:
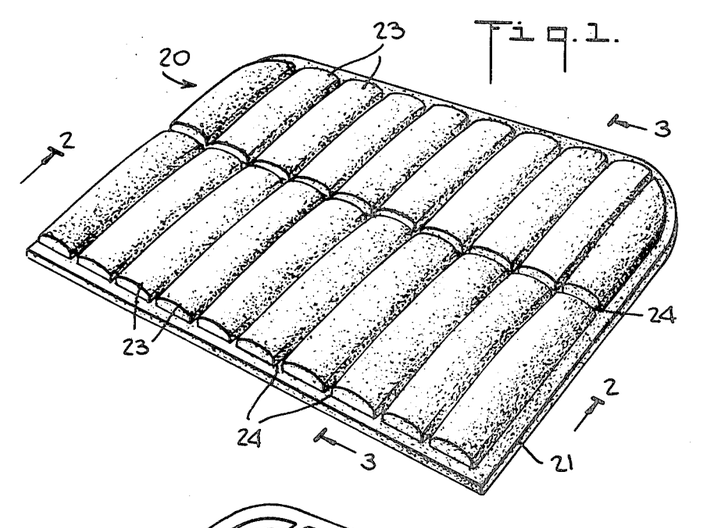
FIG. 1 is a perspective top view of a trim pad according to the present invention, the pad being shown without any upholstery attached thereto.
Figures 6, 7:
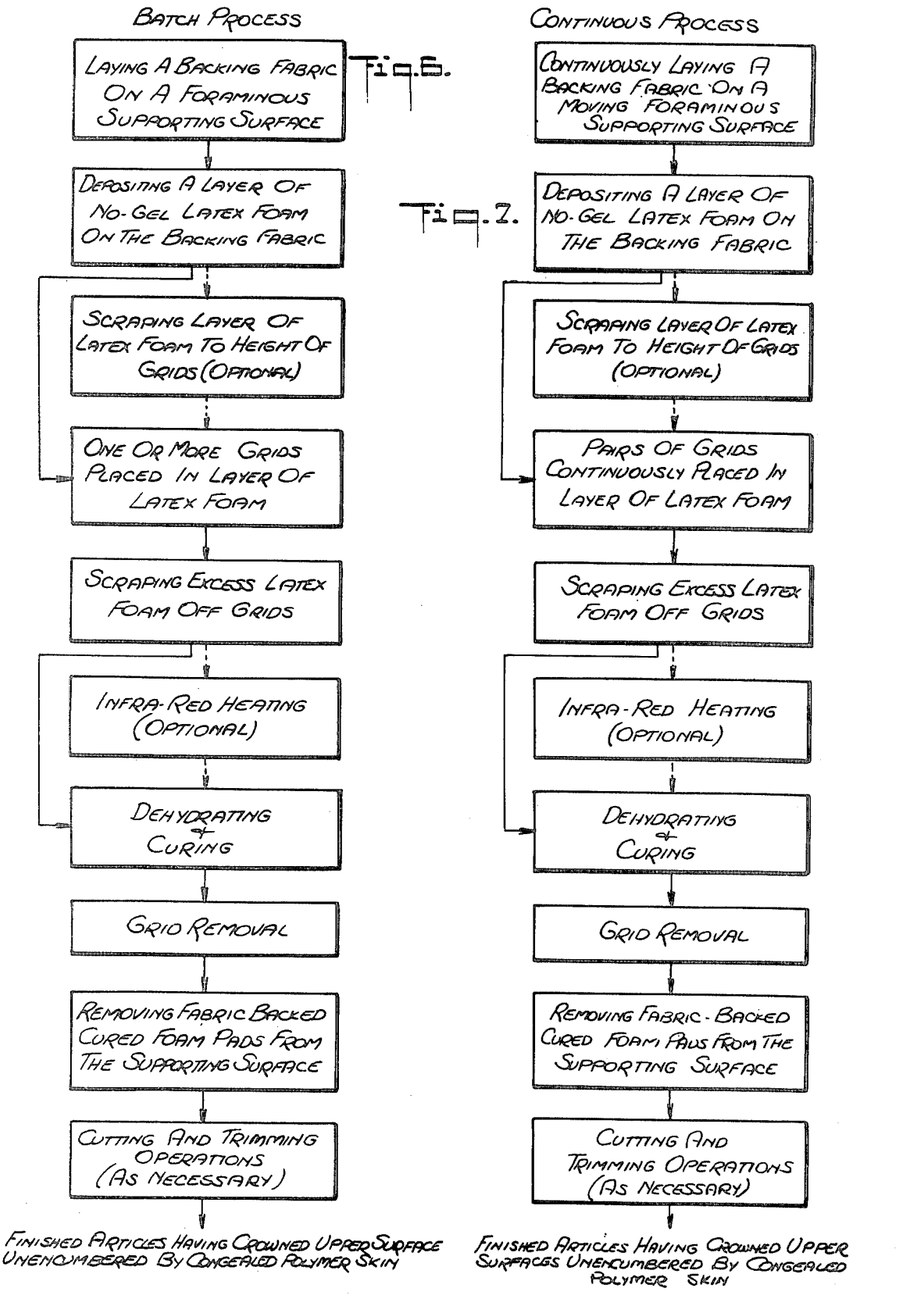
FIG. 6 is a flow diagram of a batch process according to one embodiment of the present invention for producing trim pads such as shown in FIG. 1.
FIG. 7 is a flow diagram of a continuous process according to another embodiment of the present invention for producing trim pads such as shown in FIG. 1.
Figure 8:
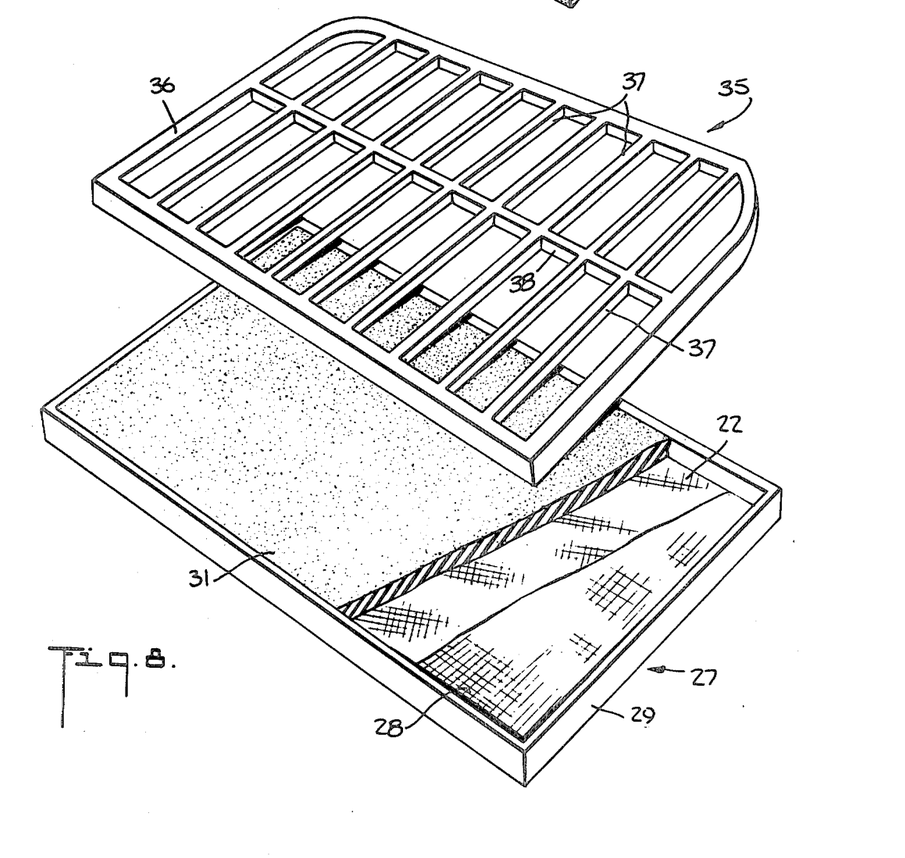
FIG. 8 is a fragmentary perspective view of one form of device usable for producing single trim pads by the batch process illustrated in FIG. 6, the grid being shown just prior to its insertion into the layer of foam in the device.
Figures 14, 15:
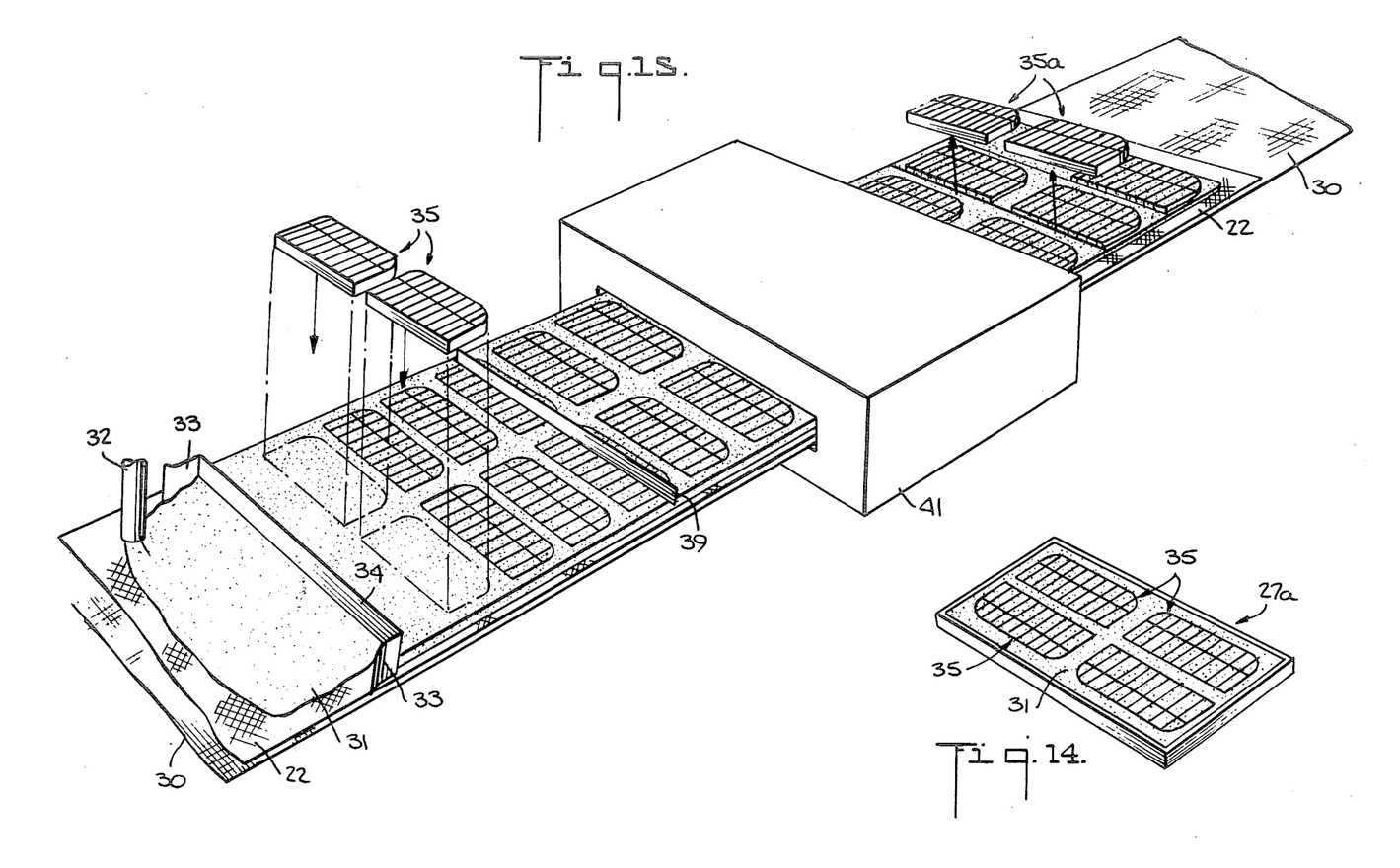
FIG. 14 is a perspective illustration, similar to FIG. 8 albeit on a smaller scale, of a batch process arrangement for producing several trim pads at a time.
FIG. 15 is a fragmentary perspective view of a system for producing multiple trim pads by the continuous process illustrated in FIG. 7.

Referring to FIGS. 6 and 7, the flow charts there illustrated represent, respectively, a batch process and a continuous process for making trim pads 20 such as shown in FIG. 1. The first step in either the batch or the continuous process is to lay either a discrete or a continuous sheet of a backing fabric 22 onto an appropriate pervious or foraminous supporting surface which will allow access of heat to and evaporation of liquid from both the upper and lower surfaces of the subsequently to be deposited layer of no-gel latex foam. For the purposes of the batch process, the supporting surface would preferably be a part of a device 27 (FIG. 8) consisting of a perforated metal plate or a wire screen 28 of finite area bounded by a peripheral frame 29 (the device 27a shown in FIG. 14 is identical to the device 27 except for size.) For the purposes of the continuous process, the supporting surface would preferably be an endless wire screen 30 (FIG. 15) adapted to be driven in a circuitous path like a conveyor belt. In actual practice, for the production of trim pads 20 such as illustrated in FIG. 1 and having the representative dimensional characteristics hereinbefore set out, the screen 28 and backing fabric sheet 22 for a single unit batch process such as represented in FIG. 8 would each be about 25–26 inches long and about 16–17 inches wide, and for a multiple unit batch process such as represented in FIG. 14 they would be about 50–52 inches long and about 32–34 inches wide. For the continuous process, the screen 30 will preferably be 56 inches wide and the backing fabric 22 about 54 inches wide. The backing fabric, as stated, may be either a woven fabric or a non-woven fabric and may be made of either natural fibers, e.g. cotton, or synthetic fibers, e.g. polypropylene, rayon, nylon, polyester, or the like, or blends of synthetic and natural fibers.

Figure 9:
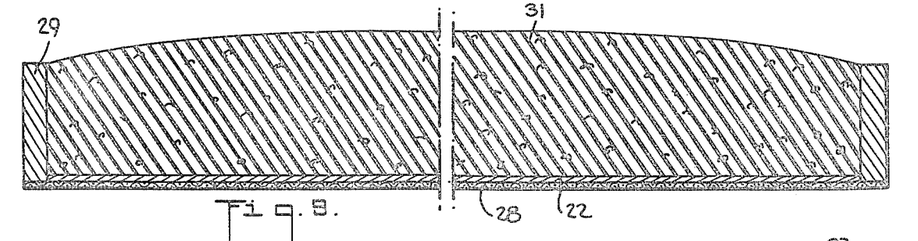
FIG. 9 is a fragmentary sectional view of the device shown in FIG. 8 with the foam deposited onto the backing fabric but before insertion of the grid.

After the backing fabric has been laid on the supporting surface, a mass of uncured frothed or whipped no-gel latex foam is deposited on the backing fabric into the form of a layer 31 of a thickness not less than the height of the grids ultimately to be inserted thereinto. The no-gel latex foam here used is one which can, for example, be made by any of the types of apparatus described in such patents as U.S. Pat. Nos. 2,695,246, 2,706,108 and 2,731,253. To avoid possible confusion, it is stressed that the reference here is to the apparatus described in those patents and not to the respective latex foam compositions which, by virtue of the inclusion of a gelling agent such as sodium silicofluoride, are not suited for use in the practice of the present invention. For the purpose of the batch process, the area for the latex foam deposit is defined by the closed frame 29, e.g. a metal frame (although it may also be made of rigid epoxy resin or polyurethane) in the form of substantially a rectangle or other appropriate geometrical configuration and of a size dependent upon the size, shape and number of the finished trim pads to be produced. The foam is laid down with the aid of a conventional reciprocating pouring spout or nozzle (not shown in FIGS. 8 and 9). In the continuous process, on the other hand, the latex foam is continuously deposited on the surface of the backing fabric by means of a suitable traversing spout or nozzle 32 (apparatus such as that disclosed in U.S. Pat. No. 2,774,106 is useful for this purpose), the lateral boundaries of the mass 31 here being defined preferably by a pair of side doctor blades 33 (FIG. 15).

Figure 10:
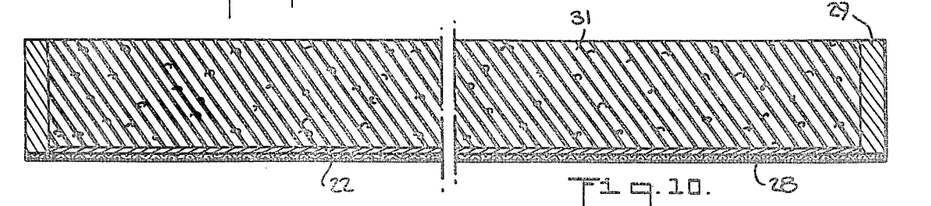
FIG. 10 is a view similar to FIG. 9 but shows the layer of foam after the optional scraping operation.

In either case, as previously mentioned, the frothed or whipped no-gel latex foam is deposited to a certain minimum height not less than the height of the grids to be placed thereinto. Thus, for the production of trim pads such as illustrated in FIG. 1 and having the representative dimensional characteristics hereinbefore set out, the grid height (as measured along the outside of the peripheral frame) and hence the said minimum height of the foam deposit would be about ⅞ inch. As a practical matter, however, the initial deposit is normally not so precisely controlled and is actually made to a height somewhat greater, say to a height of about 1 inch or so (see FIG. 9). The mass of latex foam, which is laid down over the full width of the backing fabric 22 in the batch process and to a width of about 52 inches in the continuous process, is then leveled off to the desired height by a scraping or doctoring operation which will generally be performed manually (with the aid of a suitable doctor blade or like tool not shown in FIGS. 8 and 10) in the use of the batch process and automatically by a transverse overhead doctor blade 34 (FIG. 15) extending across the supporting surface 30 in the discharge gap between the side doctor blades 33 in the case of the continuous process. The composite doctor blade structure 33/34 may be either a unitary structure or a muli-component structure with the blades 33 and 34 adjustable relative to one another, as will be readily apparent, but per se this structure forms no part of the present invention and its functions may be performed by other equivalent means. The latex foam has a high viscosity and thus will not flow laterally even when unconfined along the sides of the belt-type supporting surface in the continuous process. Merely by way of example, a styrene butadiene rubber (SBR) no-gel latex foam which has been used in the practice of the present invention had a wet froth density of 115 grams per liter and a viscosity of about 8,400 centipoises (as determined with a Brookfield Viscometer RVT having a No. 5 spindle operating at 20 rpm).

As indicated in the flow charts, and for reasons which will become clear as the description proceeds, the scraping or doctoring operation performed at this point is entirely optional and may be omitted without any adverse effect on the process or the end product thereof.

One or more open-top open-bottom grids 35, for example one or four in the case of the batch process of FIGS. 8 and 14 or a series of pairs of such grids in the case of continuous process of FIG. 15, are then placed into the mass of latex foam deposited on the backing fabric. The exact size and shape of any such grid will, of course, depend upon the desired size and shape of the finished article. Such grids preferably will be made of a suitable metal, e.g. aluminum, stainless steel and the like characterized by good heat conductivity, but grids made of epoxy resin or a rigid polyurethane foam may also be used. For the production of a trim pad 20 such as shown in FIG. 1, the grid has a substantially rectangular (although two corners at one side are shown as being curved) closed peripheral frame 36 traversed by a plurality of cross bars 37 extending from side to side across the peripheral frame and a longitudinally extending cross bar 38. The peripheral frame 36 is undercut or shouldered, as shown at 36a (FIGS. 11 to 13), along its entire inner bottom edge. In the illustrated embodiment, the vertical heights of the cross bars 37 and 38 are equal to that of the uncut section of the peripheral frame 36, and the top edges of the cross bars 37 and 38 are in a common plane with the top edge of the peripheral frame 36 while the bottom edges of the cross bars are in a common plane with the shoulder 36a of the frame, so that the base 21 of the pad 20 is of uniform thickness at all points. It will be understood, however, that the plane of the bottom edges of the cross bars could be either somewhat above or somewhat below that of the shoulder 36a, depending on whether it is desired to make the portion of the base 21 of the pad underlying the islands 23 thicker or less thick than the peripheral edge region of the base.

Figure 11:
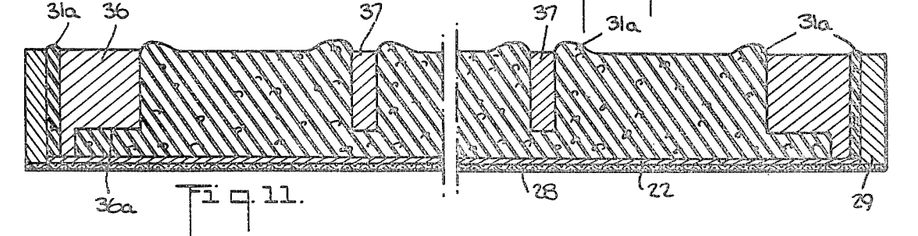
FIG. 11 is yet another similar fragmentary sectional view showing the condition of the foam after insertion of the grid.
Figure 12:
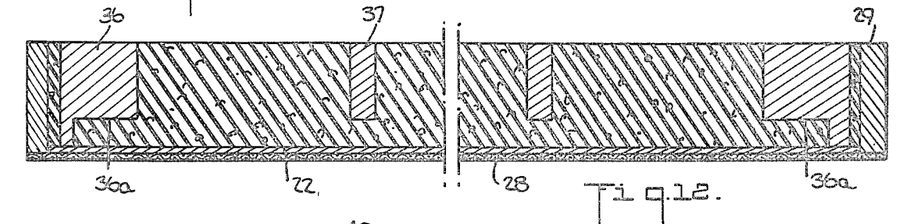
FIG. 12 is a view similar to FIG. 11 but shows the foam after the mandatory scraping operation.

Reverting now to the process, when a grid 35 is placed into the deposited mass of no-gel latex foam on the backing fabric, then, as shown in FIG. 11 (it should be understood that the following will apply as well to the systems of FIGS. 14 and 15), the portions of the latex foam adjacent the frame and the cross bars of the grid are displaced somewhat above the top surface of the grid, as shown at 31a in FIG. 11. Where the grid is placed into a mass of foam in a closed device 27, there will, of course, be some upward bulging of the foam around the outside of the frame of the grid. Where, on the other hand, the grid is placed into a laterally unconfined mass of latex foam on a conveyor belt-type supporting surface, there may or may not be some upward displacement of the foam outside the grid frame, depending on the expanse of foam there located. There will, however, be practically no lateral flow of the latex foam by virtue of its high viscosity, and certainly no flow sufficient to go beyond the marginal sections of the backing fabric left uncovered during the initial depositing of the latex foam thereonto. After the insertion of the grid into the deposited latex foam has caused some of the foam to protrude above the level of the grid, any such excess is scraped off, manually in the case of the batch process (FIG. 12) or automatically by a transverse doctor blade 39 (FIG. 15) in the case of the continuous process, to make the top surface of the latex foam remaining on the supporting surface coplanar with the top edges of the grid frame and cross bars. The so removed excess latex foam can be recycled into the layer-forming mechanism.

After this scraping or doctoring operation, which is an essential step in the process, has taken place, the remaining no-gel latex foam on the supporting surface (with the grid or grids still in place) is subjected to a relatively rapid dehydration and to a concurrent curing operation. In this regard, it will be understood, it is also essential that until the latex foam has been cured, any collapse of its cell structure must be prevented. This means that in the absence of a gelling agent (such as sodium silicofluoride and the like which, in the heretofore known and used gellable latex foams, is the component that causes the foam to become set and resistant to collapse until it is passed into a high moisture thermal curing chamber), a rapid dehydration of the no-gel latex foam is required (even though larger than usual quantities of non-gelling foam stabilizers may have been used) to set the bubble formation in the foam before the latter has a chance to collapse. For the purposes of the present invention, therefore, the supporting surface and the overlying body of latex foam thereon should be transferred as rapidly as possible after the last-described scraping operation into the heating or curing chamber, which may, for example, be a closed circulating hot air oven 40 (FIG. 13) in the case of the batch process or an open-ended tunnel-type circulating hot air oven 41 (FIG. 15) in the case of the continuous process. In either case the temperature in the chamber should be somewhere between about 260° F. and about 400° F., and preferably between about 260° F. and about 340° F., although the precise operating temperature for any given curing operation will generally be selected with an eye to such factors as the foam density and thickness, the type of oven being used and the nature of the heating system thereof, the sensitivity of the foam and the backing fabric to heat and elevated temperatures, and the duration of the heat application.

As indicated in FIGS. 6 and 7, prior to being introduced into the curing chamber, the no-gel latex foam may, as an optional preliminary procedure, first be preheated at its top surface, e.g. by being disposed or passed beneath a bank of infrared heaters (not shown). Such a preheating is found to be desirable in that by effecting the rapid preliminary dehydration of the foam to a depth of about 1/16 to ⅛ inch from the surface, it eliminates "surface checking," i.e. the creation of small fissures or blemishes in the top surface of the cured trim pad. This step can, of course, be eliminated if surface checking is not particularly objectionable to the user, and it is likewise not required for the bottom surface of the mass of foam where the backing fabric covers the same.

The reason for the characterization of the first described scraping operation as optional will now be apparent. The essential mechanical aspect of the process up to the dehydrating and curing operation is, of course, the transformation of each given section of the mass of latex foam deposited on the supporting surface into a layer the top surface of which is coplanar with the top surface of the grid placed thereinto. The amount of latex foam initially deposited is, therefore, of no real significance to the invention as such and could be any amount sufficient to form a layer higher than the grid height. The first scraping operation does afford some practical benefits, however, in that it makes a proper placement of the grids easier and also limits the amount of latex foam (identified as 31a in FIG. 11) which will ultimately be displaced by the grid, so that only a very small amount of excess foam will have to be removed by the second scraping operation. Especially in the continuous process, it will be clear, permitting large quantities of foam to accumulate in front of the doctor blade 39 would cause handling problems in removal of the excess foam and might actually cause such a bank of foam to build up that it would spill over the top and sides of the doctor blade 39.

Figure 13:
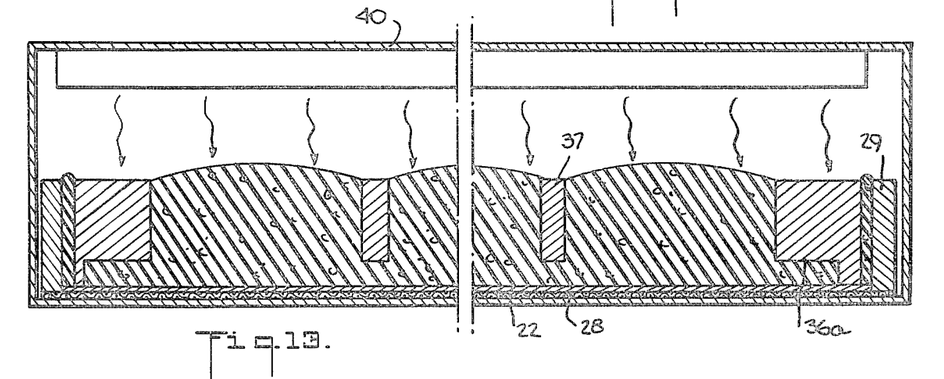
FIG. 13 is still another fragmentary sectional view showing the device of FIG. 12 in a heating chamber during the dehydration and curing operation.

Reverting now again to the process, as the no-gel latex foam becomes dehydrated, the temperature therein increases to the temperature at which curing or vulcanization takes place. During the early stages of the dehydration and curing operation, the no-gel latex foam tends to expand somewhat rather than shrink as would a gellable polymer latex foam under heat. Expansion at the latex foam/grid interfaces, however, is restrained. As a result, the top surfaces of the pockets of no-gel latex foam disposed within the grid 35 attain a crowned or convex configuration, such as shown in FIG. 13.

After the curing operation has been completed, the device 27 (or 27a) is removed from the oven or heater 40 in the case of the batch process, or the portion of the belt 30 carrying the cured latex foam section leaves the oven or heater 41 in the case of the continuous process. The grid or grids 35, which are prior to use treated (by dipping, spraying or otherwise) with a suitable conventional lubricant or mold release agent, e.g a wax in a low boiling petroleum solvent such as is available commercially under the designation MR-214, can then be easily extracted (not shown for the batch process but indicated at 35a in FIG. 15 for the continuous process) from the cured foam. The fabric-backed cured foam, even while still on the supporting surface 28 or 30, then has essentially the shape and structural characteristics shown in FIGS. 1 to 3, albeit some peripheral cutting and trimming may be necessary and, in the case of either the continuous process or the multi-unit batch process, must be performed to divide the cured sheet into individual trim pads.

It will be clear, therefore, that the channels 24 in the trim pads 20 of the present invention are formed by being molded thereinto during the curing operation and do not need to be later formed by routing. Moreover, the cutting and trimming operations referred to above and the subsequent attachment of the cover fabrics 25 to the finished trim pads by stitching likewise are simple and clean mechanical operations. The risk of air pollution and the creation of worker health hazards attendant the heretofore known trim pad manufacturing processes have thus been effectively eliminated by the present invention. At the same time, the invention eliminates the need for any use of contoured mold surfaces in the formation of crowned top surfaces on the trim pad islands as has heretofore been necessary, so that although trim pads according to the invention have top surface contours to which one would normally assume they had been molded, these surfaces are free of any congealed polymer skin thereover.

It will be understood, of course, that various polymer latices (for example, latices based on neoprene or chloroprene, natural rubber, blends of natural rubber and SBR, etc.) which can be whipped or frothed to a no-gel latex foam state and cured to produce a foam rubber type of product can be used in the practice of the present invention. A number of no-gel latex foam compositions and methods of using the same to make solid foam products are disclosed in U.S. Pat. No. Re. 27,366, and the disclosures of that patent are, therefore, specifically incorporated herein by reference.

The following example of the production of a trim pad 20 by a batch process is intended to further illustrate the practice of the present invention.

A styrene-butadiene rubber (SBR) latex typically having the following physical properties is prepared.
Total solids:69.5%
pH:10.2
surface tension:33 dynes per sq.cm.
viscosity:1540 centipoises The latex is formulated of the ingredients set forth in the following table, in which certain materials are also identified by their proprietary names or other designations and by the manufacturer's name, to assist those skilled in the art in following and applying the teachings hereof.

| Ingredient | Effective Dry Parts |
|---|---|
| Styrene-butadiene copolymer, (LPF-3757, Goodyear) | 100.00 |
| Alkylated phenol non-staining antioxidant, (NAUGAWHITE, Uniroyal Chemical) | 1.00 |
| Sodium hexametaphosphate (CALGON, Calgon Corp.) | 0.50 |
| N-Octadecyl disodium sulfosuccinate (AEROSOL 18, American Cyanamid Corp.) | 2.50 |
| Sodium salt of sulfate monoester of a mixture of various fatty alcohols, chiefly lauryl alcohol (AQUAREX WAQ, DuPont) | 1.14 |
| Dry ground nepheline syenite (MINEX 3, American Syenite Corp.) | 70.0 |
| Alumina trihydrate (HYDRAL 710, Alcoa) | 70.0 |
| Potassium hydroxide | 0.25 |
| Zinc salt of 2-mercaptobenzothiazole (OXAF, Uniroyal Chemical) | 1.25 |
| Sulfur | 1.65 |
| Zinc oxide | 1.25 |
| Carbon black - Channel type | 1.10 |

| Ingredient | Effective Dry Parts |
|---|---|
| Zinc diethyl dithiocarbamate, (ETHAZATE, Uniroyal Chemical) | 0.75 |
| Sodium polyacrylate (MODICOL VD, Nopco Chemical) | 0.11 |

The latex, without any addition of a gelling agent, is frothed by a suitable apparatus, for example such as any of those disclosed in the hereinbefore mentioned U.S. Pat. Nos. 2,695,246, 2,706,108 and 2,731,253, and the resultant latex foam is then poured or otherwise deposited, for example by an apparatus such as that disclosed in the hereinbefore mentioned U.S. Pat. No. 2,774,106, to a height of about 1 inch onto a rectangular sheet of a lightweight woven cotton backing fabric about 25 inches by 15 inches in size spread over a rectangular perforated steel plate (or a wire mesh screen or like foraminous supporting surface) of the same size and bounded by a peripheral metal frame about ⅝ inch high. Although it need not be, the deposited mass of latex foam is then scraped or doctored to the level of the top edge of the frame, after which a metal grid 35 about ⅞ inch high at its outermost edge and having cross bars about ⅝ inch high is lowered thereinto. Any resultant upwardly displaced amounts of the latex foam are then scraped or doctored off the top of the grid so that the top surfaces of all the pockets of foam are coplanar with the top edge surfaces of the cross bars and the peripheral frame of the grid.

The entire assembly is then preferably first preheated by being held under a bank of infrared heaters for a period of about 30 seconds to heat the foam surface to a temperature of about 212° F. and thereby to effect a rapid preliminary dehydration of the foam surface, and thereupon is introduced into a circulating hot dry air oven for the curing cycle. In the oven, the foam is subjected at both its top and bottom surfaces to a temperature of about 300°–340° F. for a period of about 30 minutes until the foam is fully cured. After the assembly has been removed from the oven and cooled down sufficiently to permit further handling, the grid is extracted from the cured foam body and the latter with the backing fabric vulcanized thereto stripped from the metal plate, whereupon excess foam is trimmed off and the finished trim pad, having fully formed dustfree channels bounding a plurality of islands with crowned or convex top surfaces is ready for attachment of a cover fabric and installation in a vehicle seat (in the illustrated case the pad would be used for the upper section of a back of a seat against which the rider's back would rest).

It will be understood that the foregoing description of preferred embodiments of the present invention if for purposes of illustration only, and that the various structural and operational features herein disclosed are susceptible to a number of modifications and changes none of which entails any departure from the spirit and scope of the present invention as defined in the hereto appended claims.

What is claimed is:

1. A cured polymer no-gel latex foam article having an upper surface with at least one substantially convex contour acquired by free expansion of the foam during curing without being formed to said contour, said surface contour being substantially free of congealed polymer skin having had substantially no congealed skin formation during curing and said contour not being attributable to a contour forming inclusion in the article during curing of the foam.

2. A cured no-gel latex foam construction having opposite molded sidewalls and an integral unmolded uncut convex portion formed by free and generally non-uniform expansion of the foam construction between the sidewalls during curing of the foam, the convex portion having an unsevered, unmolded free surface substantially free of congealed polymer skin having had substantially no congealed skin formation at the free surface during curing.

3. A trim pad for a vehicle seat, comprising a body of cured polymer no-gel latex foam, said body having a sheet-like base on which is arranged a plurality of channel-separated islands, having respective upper surfaces with substantially convex contours acquired during curing of the foam without the foam being formed to said respective contours, said respective contours being substantially free of congealed polymer skin having had substantially no congealed skin formation during curing and said respective contours not being attributable to contour forming inclusions in the respective islands during curing of the foam.

4. A trim pad according to claim 3, further comprising a backing fabric vulcanized to the bottom surface of said base.

5. A trim pad according to claim 3 further comprising a backing fabric vulcanized to the bottom surface of said base which backing fabric does not influence the formation of the crowned configuration at the upper surface.

6. A trim pad according to claim 5, wherein said backing fabric is a non-woven fabric.

7. A trim pad according to claim 5, wherein said backing fabric is a woven fabric.

8. A trim pad according to claim 7, wherein said backing fabric is made of cotton.

9. A trim pad according to claim 7, wherein said backing fabric is made of polyester.

* * * * *